(12) United States Patent
Kapp et al.

(10) Patent No.: US 7,955,470 B2
(45) Date of Patent: Jun. 7, 2011

(54) METHOD OF DECORATING LAMINATED GLASS

(75) Inventors: David C. Kapp, Gibsonia, PA (US); David L. McGowan, Washington, PA (US); George E. Sakoske, Washington, PA (US); Kimberly Ann Stewart, Bethel Park, PA (US); David M. Stotka, Washington, PA (US)

(73) Assignee: Ferro Corporation, Clevelend, OH (US)

( * ) Notice: Subject to any disclaimer, the term of this patent is extended or adjusted under 35 U.S.C. 154(b) by 0 days.

(21) Appl. No.: 12/567,876

(22) Filed: Sep. 28, 2009

(65) Prior Publication Data
US 2010/0071837 A1    Mar. 25, 2010

Related U.S. Application Data

(63) Continuation of application No. 11/344,950, filed on Feb. 1, 2006, now abandoned.

(60) Provisional application No. 60/657,020, filed on Feb. 28, 2005.

(51) Int. Cl.
| | |
|---|---|
| B44C 3/12 | (2006.01) |
| B32B 17/00 | (2006.01) |
| B32B 17/10 | (2006.01) |
| B32B 7/14 | (2006.01) |
| B32B 5/16 | (2006.01) |
| C03C 27/00 | (2006.01) |
| G02C 7/00 | (2006.01) |

(52) U.S. Cl. ............ 156/325; 156/63; 156/99; 428/203; 428/204

(58) Field of Classification Search .................... 156/63, 156/99, 325; 428/203, 204
See application file for complete search history.

(56) References Cited

U.S. PATENT DOCUMENTS

| | | | |
|---|---|---|---|
| 3,919,150 | A | 11/1975 | Kiel et al. |
| 4,164,602 | A | 8/1979 | Fabel |
| 4,173,672 | A | 11/1979 | Mannheim |
| 4,258,156 | A * | 3/1981 | Guerrini et al. ............... 525/531 |
| 4,266,053 | A | 5/1981 | Imanaka et al. |
| 4,900,763 | A | 2/1990 | Kraushaar |
| 4,925,734 | A | 5/1990 | Agethen et al. |
| 5,185,390 | A | 2/1993 | Fischer et al. |
| 5,322,870 | A | 6/1994 | Lin |
| 5,358,789 | A | 10/1994 | Kuo et al. |
| 5,407,474 | A * | 4/1995 | Airey et al. ................. 106/31.05 |
| 5,468,603 | A | 11/1995 | Kub |
| 5,549,929 | A * | 8/1996 | Scheibelhoffer et al. ..... 427/282 |
| 5,876,493 | A | 3/1999 | Menovcik et al. |
| 6,042,947 | A | 3/2000 | Asakura et al. |
| 6,225,384 | B1 | 5/2001 | Renz et al. |
| 6,231,654 | B1 | 5/2001 | Elwakil |
| 6,432,544 | B1 | 8/2002 | Stewart et al. |
| 6,689,457 | B1 | 2/2004 | Chang et al. |
| 6,720,082 | B1 | 4/2004 | Hashimoto et al. |
| 6,797,396 | B1 | 9/2004 | Liu et al. |
| 6,808,804 | B2 | 10/2004 | Hotaka et al. |

(Continued)

Primary Examiner — Philip C Tucker
Assistant Examiner — Michael N Orlando
(74) Attorney, Agent, or Firm — Rankin, Hill & Clark LLP

(57) ABSTRACT

A method of decorating laminated glass is disclosed. A pigment package composition comprising a cross-linkable thermoset resin, a crosslinker capable of crosslinking the thermoset resin, and a pigment is applied to a glass substrate. The crosslinker and thermoset resin are cured at a relatively low temperature (ca. 400° F.). The use of an organic based pigment composition allows use of thinner glass sheets than with traditional ceramic enamel pigment compositions.

17 Claims, 2 Drawing Sheets

U.S. PATENT DOCUMENTS

| | | |
|---|---|---|
| 6,818,281 B2 | 11/2004 | Blevins et al. |
| 2002/0176983 A1 | 11/2002 | Yamazaki et al. |
| 2003/0148114 A1* | 8/2003 | Bourcier et al. ............... 428/432 |
| 2003/0158283 A1 | 8/2003 | Ylitalo et al. |

* cited by examiner

METHOD OF DECORATING LAMINATED GLASS

This application is a continuation of U.S. Ser. No. 11/334,950, filed Feb. 1, 2006, now abandoned. The application further claims priority to provisional application U.S. Ser. No 60/657,020, entitled "METHOD OF DECORATING LAMINATED GLASS" filed 28 Feb. 2005, which is hereby incorporated herein by reference in its entirety.

BACKGROUND OF THE INVENTION

1. Field of Invention

The present invention relates to the decoration of glass substrates with organically based pigment compositions that are free of ceramic enamels, particularly for use with automotive glass.

2. Description of Related Art

Decoration of laminated safety glass by conventional ceramic enamels is constrained by the minimum thickness needed to prevent warping of the decorated sheet during the firing process. Prior art methods not only required thicker glass panels to withstand the heat of firing an enamel color/pigment package, but the enamel based pigment composition had to be applied prior to a press-bend or other heating operation. For two reasons, then, it was possible to get a rippled or warped glass pane: (1) because the glass ceramic pigment layer was bent along with the (double) glass layers and (2) because the panels were thick enough to withstand enamel firing. Prior art decoration methods could not employ screen-printing to apply the glass ceramic enamel to an already bent glass, because screen printing requires a flat surface, and because the ceramic based enamel would require a heating operation to sinter and fuse the enamel which could further cause warping or shape distortion.

SUMMARY OF THE INVENTION

Instead of using a ceramic enamel frit containing a pigment to effect the coloration of a windshield or the application of an opaque band around a windshield, the invention uses a thermoset resin (crosslinking resin) and a curing agent. The present invention permits a broader array of pigment application techniques, including ink jet printing. Further, because ink jet printing can be done on a curved surface, it is possible to print the decoration on the second or third (i.e., interior) surfaces after bending the glass.

Decoration with organic inks and/or coatings takes place at temperatures too low to distort the glass, permitting the use of thinner glass sheets and giving lighter laminated panels with superior clarity. Such laminations are useful in applications such as flat vehicle glass, curved windshields, marine transparencies, and safety spandrels.

Organic decorations can be applied to the second or third (interior) surfaces of a laminated glass panel, and interpenetrate with a laminating film such as polyvinyl butyral. This interpenetrating effect maintains an acceptable level of bonding between the laminating resin film and the glass sheets. The organic decoration can be in ink or coating form and may be applied by the traditional methods such as screen printing, direct or reverse roll coating, air-assisted or airless spray, digital inkjet, rotary screen print, thermal transfer ribbon, electrostatic disk, and electrostatic bell. Cure can be achieved by thermal initiated crosslinking, ultraviolet or electron beam photopolymerization, air catalyzed self-condensation, two-component condensation, or the like. The controlling requirement is that the final cured film be sufficiently interpenetrable with the laminating film so that a bond of adequate strength is maintained between the lamination and glass sheets. In the case of automotive obscuration bands, decorative and protective effects should also be achieved. Applying the organic decoration to the interior surface of a laminated glass panel protects the decorated surface form mechanical and/or chemical damage that may occur during manufacture or service.

The invention involves a method of forming a decorated glass structure comprising: applying to a first glass substrate an organic pigment package comprising, prior to curing, a crosslinkable thermoset resin, a crosslinker capable of crosslinking the thermoset resin, and a pigment; curing the crosslinker and the thermoset resin to form a cured layer on the first substrate; stacking an acetal layer and a second glass substrate onto the cured layer such that the acetal and the cured layer lie between the first substrate and a second glass substrate; and heating the first and second stacked glass substrates to flow the acetal layer and effect interpenetration of the acetal layer with the cured layer.

DETAILED DESCRIPTION OF THE INVENTION

Figure 1:
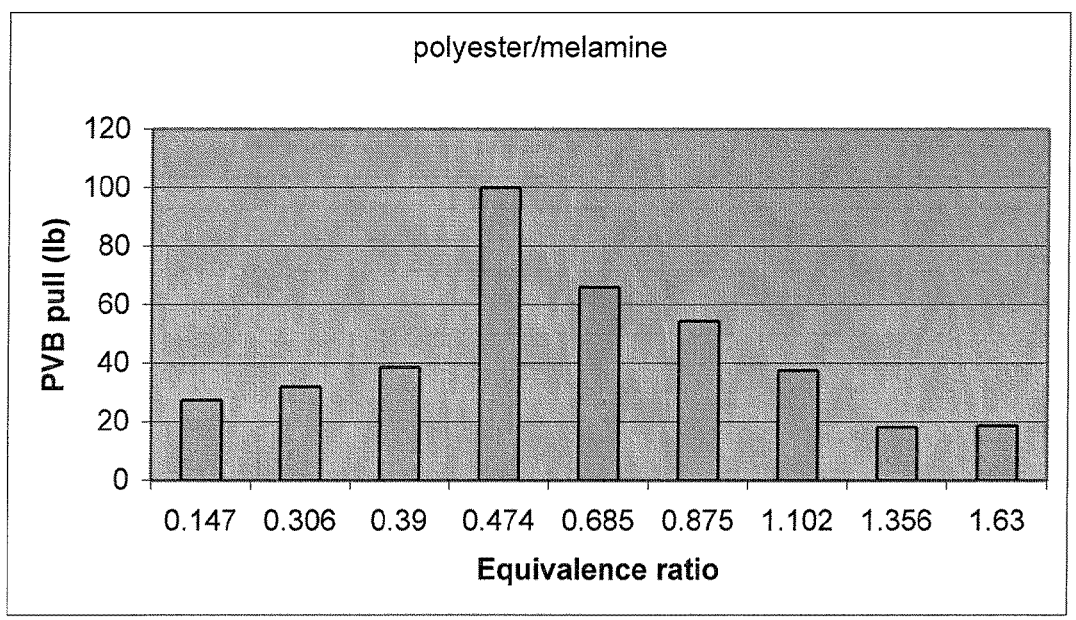
FIG. 1 is a graph showing the pull strength in pounds required to delaminate a PVB layer from a cured polyester melamine layer in relation to the equivalence ratio between melamine crosslinker and polyester.

The method of forming a decorated glass structure involves a pigment package composition, which comprises a crosslinkable thermoset resin, a crosslinker and a pigment. However, the composition typically further comprises solvents, catalysts, surfactants, light stabilizers, UV blockers, and adhesion promoters. Each ingredient is discussed in turn.

Thermoset Resin. Broadly, the green pigment package composition, prior to curing, comprises about 50 to about 95% thermoset resin, preferably about 55 to about 90%, more preferably about 60 to about 75% and most preferably about 60 to about 65%. All percentages herein are by weight. The thermoset resin may be any thermoplastic polymer having crosslinkable functional sites. Suitable types of thermoset resins include polyesters, urethanes, vinyl polymers, acrylics, styrenes, aromatic polyolefins, aliphatic polyolefins, polycarbonates, copolymers thereof, and blends thereof. The preferred thermoset resins are polyesters. Polyester resins useful herein include those having a hydroxyl equivalent weight of about 200 to about 1500, preferably about 450 to about 650. Suitable polyester resins include several from Etna Products Co. of Chagrin Falls, Ohio, including SCD®-1040, SCD-1060, SCD-16602, SCD-18263, SCD-19071 TX, and SCD-6000. Other polyester resins suitable for use in this invention include Cargill's 66-6613 resin; Chempol® 11-2339 and Chempol® 11-3369 resin by Cook Composites and Polymers; Kelsol® 301, a trademark for a polyester from Reichhold Co as well as AROPLAZ® 6025-Z-70 resin by Reichhold which is believed to be the product of the condensation of a 67:33 by weight mixture of isophthalic acid and adipic acid with a molar excess of propylene glycol to give an OH value of about 62 (70% solids), K-Flex® 188 from King Industries, and Resydrol® VAN 6098, a trademark for a polyester from Solutia Co. Details of polyesters suitable for use in the present invention are further provided in U.S. Pat. No. 5,326,820, and highly cyclic-aliphatic polyesters described in U.S. Pat. No. 5,262,494, both of which patents are hereby incorporated by reference. A preferred polyester is Etna's SCD-6000, which is an oil-free thermoset polyester resin, having a hydroxyl equivalent weight of 529.

Precursors of polyester resins can also be included in the inventive compositions. The polyester resins are made by a condensation polymerization reaction, usually with heat in the presence of a catalyst, or a mixture of a polybasic acid and a polyhydric alcohol (polyol). Exemplary acids to form the alkyd resin or reactive polyester include adipic acid, glutaric acid, succinic acid, azelaic acid, sebacic acid, terephthalic acid, and phthalic anhydride and the like. Examples of polybasic alcohols include ethylene glycol, propylene glycol, diethylene glycol, dipropylene glycol, glycerine, butylene glycol, 2,2-dimethyl-1,3-propanediol, trimethylol propane, 1,4-cyclohexanedimethanol, pentaerythritol, trimethylolethane and the like.

Crosslinkers. The crosslinking resin forms crosslinks with the pigment-bearing thermoset resin. The density of the crosslinks therebetween determines the strength of the final laminated glass panel. The pigment package composition herein comprises about 5 to about 20 wt % of one or more crosslinkers, preferably about 8 to about 15 wt % and preferably about 10 to about 12 wt %. The noted percentages are prior to curing.

In prior art formulations the use of an organic-based pigment composition (i.e., thermoset resin+crosslinker+pigment) tends to disrupt the adhesion between a glass layer and a PVB layer in a safety glass windshield. The inventors have discovered a method and composition that minimizes disruption in the adhesion of one glass layer to another through the PVB layer, which normally occurs when an organic coating is interposed between the glass and the acetal. The method promotes the interpenetration of the PVB layer into the pigment-bearing organic coating without compromising the strength of the laminated glass panel.

Crosslinking agents such as amines, amino resins, amido resins, isocyanates, ureas and dialdehydes are suitable for use in the present invention. Combinations of crosslinkers are also suitable. For example, aminoplasts are oligomers that are the reaction products of aldehydes, with amines or amides. The amines and amides are exemplified by melamine, urea, and benzoguanamine. Exemplary aldehydes include formaldehyde and glyoxal. Exemplary aminoplasts include melamine-formaldehyde resins, melamine-glyoxal resins, urea-formaldehyde resins, urea-glyoxal resins, carbamide-formaldehyde resins, benzoguanamine-formaldehyde resins, and glycol-urea resins.

While urea and melamine with formaldehyde and glyoxal are the basic constituents of the crosslinker/thermoset package, but melamine may be partly or completely replaced by benzoguanamine and/or acetoguanamine. Melamine-formaldehyde and urea-formaldehyde are the preferred amino resins, and combinations thereof may be used also. Further examples of preferred amino resins include those based on ethylene urea, for example, a resin based on dimethylolethylene urea is prepared from urea, ethylene diamine, and formaldehyde; propylene urea-formaldehyde, a resin prepared from urea, 1,3-diamino-propane and formaldehyde; triazone resin made from urea, formaldehyde and a primary aliphatic amine such as hydroxyethylamine; uron resins, mixtures of a minor amount of melamine resin and uron (predominantly N,N'-bismethoxymethyl) uron plus about 25% methylated urea formaldehyde; melamine-formaldehyde resins including the dimethyl ether of trimethylolmelamine; and methylol carbamate resins.

It is sometimes advantageous to employ precursors of aminoplasts such as hexamethylol melamine, dimethylol urea, and their etherified forms, i.e., modified with alkanols having from one to four carbon atoms. Hexamethoxymethyl melamine and tetramethoxy glycoluril exemplify said etherified forms. Thus, a wide variety of commercially available aminoplasts and their precursors can be used for crosslinking with the thermoset resins of the invention.

In general, highly alkylated and partially alkylated melamine-formaldehyde resins are useful. Particularly preferred are the amino crosslinking agents sold by Cytec Industries, Inc, of West Patterson, N.J., under the trademarks Cymel®, Melurac®, and Urac®. Cytec's melamine urea formaldehyde resins include Melurac® 450HF, Melurac 4004, and Melurac 5005; urea formaldehyde resins such as Urac® 185 are similarly suitable. In particular, highly alkylated melamine-formaldehyde resins such as hexamethoxymethylmelamine, available as Cymel 301, Cymel 303, and Cymel 385 (methoxymethyl methylol melamine) are useful, further, melamine formaldehyde resins Cymel 401, Cymel 405LD, Cymel 406, Cymel 412, Cymel 481, Cymel 483, Cymel WE-1025D, and Cymel 9800 may be used. Partially alkylated melamine-formaldehyde resins are also suitable. Most preferred is Cymel 303.

While single package formulas possess handling and processing advantages, two-component formulations may also be used. In a two-component formulation, the thermoset resin/pigment component and the crosslinker component are supplied separately and are mixed immediately prior to application. In this case, the crosslinker component is typically one that will react with the thermoset resin component at low temperature or room temperature. The advantage to this type of formulation is that a cured composition can be achieved with little or no external heating. The disadvantage is that the mixture possesses a relatively short working lifetime, making storage and re-use of the mixture impractical. Crosslinkers of this type are typically unblocked isocyanates such toluene diisocyanate and hexamethylene 1,6-diisocyanate, such as Coronate HXLV available from Nippon Polyurethane Company, Ltd.

While not being bound theory, it is believed that the strength of a decorated glass laminate is related to the degree of interpenetration between the polymeric network formed by the condensation of the thermoset resin with the crosslinker, and the polymeric network of the acetal (PVB) sheet in the laminate. The molar relationship between crosslinker and thermoset resin is known as the equivalence ratio. First, the molar amounts of crosslinker and thermoset resin are each individually expressed as the ratio of functional groups to molecular weight. These are the equivalent weights of the crosslinker and the thermoset resin. Multiplying the weight of each resin by its respective equivalent weight gives the number of equivalents in the formulation. The ratio of (equivalents of crosslinker) to (equivalents of thermoset resin) is the equivalence ratio. Prior to curing, the equivalence ratio of crosslinker to thermoset resin may be about 0.2 to 1.2. More preferably, this ratio is about 0.4 to about 0.9. More preferably still the ratio is about 0.45 to about 0.7. Most preferably, a pigment package composition comprises a melamine-formaldehyde crosslinker and a polyester thermoset resin wherein the equivalence ratio of crosslinker to polyester is about 0.45 to about 0.7.

The curing of hydroxyl-functional polyesters with aminoplasts can be effected over a wide range of cure conditions. For example cure can be effected in only several seconds at very high temperatures, e.g., about 650° C. (1200° F.). Use of lower temperatures, e.g., about 100-120° C. (about 210-250° F.), can require about 40-60 minutes. To cure the thermoset resin-crosslinker systems contemplated herein, a temperature as high as about 540-650° C. (about 1000-1200° F.) can be used to effect curing in as little as about 60-80 seconds, for example, about 70 seconds at about 620° C. (about 1150° F.). However, in accordance with the principles of the invention, such as minimizing glass thickness and warpage during firing and cure, a maximum glass temperature during cure of about 400° F. (about 205° C.) is preferred, for example about a 20 minute cure.

The aminoplast oligomer compound of the composition may be a urethane-amine adduct, prepared by reaction of an amine with a polyisocyanate. The polyisocyanate may be a simple polyisocyanate such as toluene diisocyanate, diphenylmethane-4,4-diisocyanate, or hexamethylene diisocyanate, or may be prepared by reaction of a polyol and a polyisocyanate, such as naphthalene di-isocyanate or methyl isocyanate. Further isocyanates include methylene-bis-cyclohexyl isocyanate, isophorone diisocyanate, and polymethylene polyphenyl isocyanate. Examples of suitable polyol components include polyester polyols, polyether polyols and polyester polyether block copolymers.

Pigment. The pigment may be essentially any organic or inorganic colorant, pigment, or dye that can be used to impart color or opacity to a glass structure. While a variety of pigment loads is possible, typically the pigment package composition of the present invention comprises about 2 to about 20 wt % of one or more pigments, preferably about 5 to about 15 wt % and more preferably about 7 to about 10 wt %. Black, dark, or opacifying pigments may be used to create an opaque sun blocking band around the periphery of a windshield, either for aesthetic purposes, or for protective purposes, or both. A typical protective purpose is to protect from sunlight degradation the adhesive that holds the windshield to the frame of the car.

Conventional pigments including carbon blacks, iron pigments, cobalt pigments, cadmium pigments, chromium pigments, copper mercury pigments, titanium pigments, zinc pigments, lead pigments, magnesium pigments, manganese pigments, and vanadium pigments are suitable. Further suitable inorganic pigments include carbon black, $TiO_2$, $Fe_2O_3$, $Fe_3O_4$, $V_2O_5$, $CoO$—$Al_2O_3$—$TiO_2$—$Cr_2O_3$, $CoO$—$Al_2O_3$, $CeO_2$, $ZrO_2$, $ZnO$, magnesium ferrite, mercuric sulfide, cadmium sulfoselenide, molybdenum chromate, zircon, copper chrome black, iron nickel manganese chrome black, cobalt aluminate blue, zinc iron chrome brown, iron cobalt chrome, chromium oxide green, chrome yellow, and moly-orange.

Also envisioned herein are pigment package compositions that result in glass decorated structures, which, when recycled, do not cause subsequently formed glass products to be discolored. In particular, in such an embodiment it is advantageous to avoid pigments or other ingredients which include cobalt, chromium, copper, nickel, vanadium and zinc.

Further, there has been an effort in recent years to eliminate certain heavy metals from industrial production lines and from waste streams. To that end, also envisioned are pigment package compositions, which are devoid of pigments and other ingredients containing lead, cadmium and mercury. With respect to the avoidance of both discolored recycled products and of heavy metals, such embodiments do not contain any intentionally added cobalt, chromium, copper, nickel, vanadium, zinc, lead, cadmium or mercury.

Organic dyes may be suitable as pigments. Useful dyes include cyanine dyes; phthalocyanine dyes, such as phthalocyanine blue and phthalocyanine green; azo dyes, such as disazo yellow; polycyclic quinone dyes, such as anthraquinone or dibromoanthraquinone; dioxane dyes, such as dioxane violet; stilbene dyes, coumarin dyes, naphthalimide dyes, pyridine dyes, rhodamine dyes, and oxazine dyes.

Stilbene dyes are exemplified by 1,4-bis(2-methylstyryl) benzene, trans-4,4'-diphenylstilbene. Coumarin dyes are exemplified by 7-hydroxy-4-methylcoumarin; 2, 3, 5, 6-1H, 4H-tetrahydro-8-trifluoromethylquinorizino(9,9a, 1-gh)coumarin; 3-(2'-benzothiazolyl)-7-diethylaminocoumarin; and 3-(2'-benzilimidazolyl)-7-N,N-diethylaminocoumarin. Naphthalimide dyes are exemplified by basic yellow 51, solvent yellow 11, and solvent yellow 116. Rhodamine dyes are exemplified by 2-(6-(diethylamino)-3-(diethylimino)-3H-xanthene-9-yl)benzenecarboxylic acid, rhodamine B, and rhodamine 6G. Cyanine dyes are exemplified by 4-dicyanomethylene-2-methyl-6-(p-dimethylaminostilyl-)-4H-pyran. Pyridine dyes are exemplified by 1-ethyl-2-(4-(p-dimethylaminophenyl)-1,3-butadienyl)-pyridium-perchlorate.

Solvent. Solvents include glycols such as ethylene glycol, propylene glycol and hexylene glycol; alpha- or beta-terpineol; higher boiling alcohols such as Dowanol® (diethylene glycol monoethyl ether); butyl Carbitol® (diethylene glycol monobutyl ether); dibutyl Carbitol® (diethylene glycol dibutyl ether); butyl Carbitol® acetate (diethylene glycol monobutyl ether acetate); Texanol® (2,2,4-trimethyl-1,3-pentanediol monoisobutyrate), as well as other alcohol esters, kerosene, and dibutyl phthalate. Products sold under the Texanol® trademark are available from Eastman Chemical Company, Kingsport, Tenn.; those sold under the Dowanol® and Carbitol® trademarks are available from Dow Chemical Co., Midland, Mich.

Dispersing Surfactant. A dispersing surfactant assists in pigment wetting, when an insoluble particulate inorganic pigment is used. A dispersing surfactant typically contains a block copolymer with pigment affinic groups. For example, surfactants sold under the Disperbyk® and Byk® trademarks by Byk Chemie of Wesel, Germany, such as Disperbyk 162 and 163, which are solutions of high molecular weight block copolymers with pigment affinic groups, and a blend of solvents (xylene, butylacetate and methoxypropylacetate). Disperbyk 162 has these solvents in a 3/1/1 ratio, while the ratio in Disperbyk 163 is 4/2/5. Disperbyk 140 is a solution of alkyl-ammonium salt of an acidic polymer in a methoxypropylacetate solvent.

Rheological Modifier. A rheological modifier is used to adjust the viscosity of the green pigment package composition. A variety of rheological modifiers may be used, including those sold under the Byk®, Disperplast®, and Viscobyk® trademarks, available from Byk Chemie. They include, for example, the BYK 400 series, such as BYK 411 and BYK 420, (modified urea solutions); the BYK W-900 series, (pigment wetting and dispersing additives); the Disperplast series, (pigment wetting and dispersing additives for plastisols and organosols); and the Viscobyk series, (viscosity depressants for plastisols and organosols).

Flow aid. A flow aid is an additive used to control the viscosity and rheology of a pigment composition, which affects the flow properties of liquid systems in a controlled and predictable way. Rheology modifiers are generally considered as being either pseudoplastic or thixotropic in nature. Suitable surfactants herein include those sold commercially under the Additol®, Multiflow®, and Modaflow® trademarks by UCB Surface Specialties of Smyrna, Ga. For example, Additol VXW 6388, Additol VXW 6360, Additol VXL 4930, Additol XL 425, Additol XW 395, Modaflow AQ 3000, Modaflow AQ 3025, Modaflow Resin, and Multiflow Resin.

Adhesion promoter. Adhesion promoting polymers are used to improve the compatibility between a polymer and a filler. Suitable adhesion promoters include those sold by GE Silicones of Wilton, Conn. under the Silquest®, CoatOSil®, NXT®, XL-Pearl™ and Silcat® trademarks. Examples include the following product numbers, sold under the Silquest® trademark: A1101, A1102, A1126, A1128, A1130, A1230, A1310, A162, A174, A178, A187, A2120. For example, Silquest® A-187 is (3-glycidoxypropyl)trimethoxysilane, which is an epoxysilane adhesion promoter. The inventors herein have found that aromatic epoxies crosslinked with amines or amides produced unacceptable results. Silanes sold by Degussa AG of Düsseldorf, Germany, under the Dynasylan® trademark are also suitable. Most preferred herein is Silquest A187.

Acid Catalyst. Acidic catalysts may be used to control cure parameters of the polyester with an aminoplast resin by lowering the required temperature or raising the reaction rate or both. The amount and type of catalyst used depends on the thermoset resin and the crosslinker chosen. However, in general, the pigment package composition herein comprises about 0.1 to about 2.0 wt % of catalyst, preferably 0.2 to about 1.5% and more preferably 0.7 to about 1.4%. When it is desirable to reduce the rate of cure at ambient storage temperatures, the acidic catalyst may be blocked with an amine or other suitable blocking agent. Volatile amines, which may escape from the curing film when the catalyst is unblocked by heat, are suitable for this purpose. The curing may also be retarded by the addition of free amines such as triethanolamine. Also, the potential reaction of the acidic catalyst with the hydroxyl groups on the polyester may be blocked by the addition of relatively non-volatile alcohols such as butanol and 2-ethylhexanol; such alcohols also provide viscosity stability in the package. They inhibit the reaction of the polyester with the aminoplast.

Acid catalysts commercially available from King Industries under the NACURE® and K-CURE® trademarks. For example, an amine-blocked dinonyl naphthalenesulfonic acid sold as NACURE 1557 is an example of the blocked acid catalyst contemplated for use in the aminoplast curing of the composition of this invention. Another suitable catalyst is NACURE 5225, which is an amine-blocked dodecyl benzenesulfonic acid. Others include the following product numbers, all sold under the NACURE trademark: 3525, 3527, 1323, 1557, 5528, 5925. Most preferred is NACURE 5225.

Stabilizers. Light or UV stabilizers are classified according to their mode of action: UV blockers—that act by shielding the polymer from ultraviolet light; or hindered amine light stabilizers (HALS)—that act by scavenging the radical intermediates formed in the photo-oxidation process. The compositions of the invention comprise about 0.1 to about 2 wt % of a light stabilizer, preferably about 0.5 to about 1.5%, and further comprise about 0.1 to about 4 wt % of a UV blocker, preferably about 1 to about 3%.

Light stabilizers and UV blockers sold under the Irgafos®, Irganox®, Irgastab®, Uvitex®, and Tinuvin® trademarks by from Ciba Specialty Chemicals, Tarrytown, N.Y., may be used, including product numbers 292 HP, 384-2, 400, 405, 411L, 5050, 5055, 5060, 5011, all using the Tinuvin trademark. Suitable UV blocking agents include Norbloc 7966 (2-(2'hydroxy-5' methacryloxyethylphenyl)-2H-benzotriazole); Tinuvin 123 (bis-(2,2,6,6-tetramethyl-1-(octyloxy)-4-piperidinyl)ester); Tinuvin 99 (3-(2H-benzotriazole-2-yl) 5-(1,1-dimethyl ethyl)-4-hydroxybenzenepropanoic acid, C7-9-branched alkyl esters) Tinuvin 171 (2-(2H-benzotriazol-2-yl)-6-dodecyl-4-methyl-phenol). Products sold under the Norbloc® trademark are available from Janssen Pharmaceutica of Beerse, Belgium.

Suitable hindered amine light stabilizers (HALS) are sold by the Clariant Corporation, Charlotte, N.C., under the Hostavin® trademark, including Hostavin 845, Hostavin N20, Hostavin N24, Hostavin N30, Hostavin N391, Hostavin PR31, Hostavin ARO8, and Hostavin PR25. HALS are extremely efficient stabilizers against light-induced degradation of most polymers. They do not absorb UV radiation, but act to inhibit degradation of the polymer, thus extending its durability. Significant levels of stabilization are achieved at relatively low concentrations. The high efficiency and longevity of HALS are due to a cyclic process wherein the HALS are regenerated rather than consumed during the stabilization process. They also protect polymers from thermal degradation and can be used as thermal stabilizers.

Applications. The pigment package composition of the present invention may be used to color or decorate a variety of glass substrates, including automotive, architectural, construction, home appliance, and beverage glass industries, e.g., car windshields and other automotive glass, residential and commercial windows, ceramic cooktops and beverage bottles. For example, the ceramic enamel composition may be used to form a border, which is colored and/or UV resistant, around the periphery of a pane of automotive glass. If a conductive constituent such as copper or silver is added to the inventive pigment package composition, it may be used to form a functional coating, such as a heated glass windshield.

Further, the pigment package composition may be used as an impact resistive or dispersive layer in bullet-proof glass such as PVB-interlayered polycarbonate windshields or glass panes. In such an embodiment, it may be advantageous to provide the pigment package composition without a coloring pigment, wherein the thermoset resin and crosslinker serve solely to strengthen the polycarbonate laminate.

Envisioned herein is a method of forming a decorated glass structure comprising applying to a first glass substrate an organic pigment package comprising, prior to curing: a cross linkable thermoset resin, a crosslinker capable of crosslinking the thermoset resin, and a pigment. The crosslinker and the thermoset resin are cured to form a cured layer on the first substrate. An acetal layer and a second glass substrate are stacked onto the first substrate such that the acetal and the cured layer lie between the first and second glass substrates. The stacked glass substrates are heated to flow the acetal layer and effect interpenetration of the acetal layer with the cured layer.

Example 1

The inventive pigment package composition was formulated according to Table 1, which follows, with percentages by weight.

TABLE 1

| Formulation for Organic Pigment Package Composition | |
|---|---|
| SCD-6000 Polyester resin | 62.8% |
| Cymel 303 Crosslinking resin | 10.5% |
| Degussa Special #4 black pigment | 8.3% |
| Propylene glycol solvent | 9.9% |
| Nacure 5225 catalyst | 0.7% |
| Disperbyk 163 dispersing surfactant | 0.5% |
| Modaflow surfactant flow aid | 1.3% |
| Byk 410 Rheological modifier | 1.1% |

TABLE 1-continued

Formulation for Organic Pigment Package Composition

| | |
|---|---|
| Tinuvin 1130 UV Blocker | 2.0% |
| Tinuvin 292 light stabilizer | 1.0% |
| Silquest A-187 silane adhesion promoter | 1.5% |

From the ingredients of Table 1, the polyester and crosslinking resins are preblended using a high-speed stirrer, the black pigment is added and the mixture is stirred to form a relatively homogenous paste. The paste is then passed over a three-roll mill to disperse the pigment to a reading of at least 6.0 on a Hegeman fineness-of-grind gauge (Byk-Gardner, Silver Spring Md.), in accordance with ASTM D1210, D333, and D1316. The remaining ingredients are then blended in under stirring. The resulting composition is screen printed as a 3"×3" (7.6 cm×7.6 cm) square onto a 4"×5" (10.2 cm×12.7 cm) soda lime glass panel using a 200 mesh polyester screen. The printed panel is then cured in a 205° C. (400° F.) oven for twenty minutes.

The strength of the film is tested as follows. A polyvinyl-butyral (PVB) film is cut into a square 2 inches (58 mm) on a side. A slit about 1.5 cm long is made in the center of the PVB square, parallel to a side. Two mild steel "L" brackets commonly available at any home improvement store serve as the attachment point for a spring scale. The brackets have holes at each end. The two "L" brackets are placed back-to-back and the PVB square is slipped down over the upright arms until the film is lying against the horizontal arms. The bracket and film assembly is then placed in the middle of the cured print and the entire unit is put in a 205° C. oven for seven minutes to melt the acetal film onto the surface of the organic print.

After melting in the oven, the brackets are now affixed to the organic print by a thick, transparent PVB layer. This assembly is then placed in freezer for a minimum of one hour. Freezing reduces the flexibility of the acetal so that upon performance of the pull test, none of the upward force is mitigated by internal stretching of the PVB.

After removing the assembly from the freezer, a spring scale is hooked into the hole at the top of the vertical bracket, and pulled vertically with a single, continuous motion. Care should be taken that the sample does not have time to warm up and the PVB regain elasticity. A clamp or other holder should be used to secure the glass plate in the event that the glass breaks during the test. When sufficient force is applied, the acetal/bracket assembly will break loose from the coated glass plate. The force needed to break the bond between the acetal and the coating can be read off the spring scale.

As shown in FIG. 1 the pull-strength maximum (maximum PVB pull rating of 100 pounds) of the formulation of Example 1 was produced at an equivalence ratio of 0.474. Markedly poorer adhesion was observed above and below this level. The other formulations varied the relative amounts of melamine and polyester (in FIG. 1 from left to right, the melamine content increased) but the initial weight of (melamine+polyester) remained constant, as did the amounts of the other ingredients.

Without being bound by theory, the effect appears to be a balance between intra-polymer integrity of the ink and inter-polymer penetration between the acetal film and the ink film. At the lower ratios, solvent resistance is negligible, and the film appears to tear when the acetal is removed. At higher ratios, solvent resistance is very good and the acetal releases from the ink film cleanly, with no disruption of the ink. At the maximum, solvent resistance is marginal, and in some areas, the acetal leaves some ink remaining on the glass while in other areas the ink is entirely removed. The inventors interpret this behavior to mean that the acetal penetrates the ink film at the lowest equivalence ratios, but the ink film is so poorly crosslinked that the acetal pull test causes intra-polymer tearing and a longitudinal scission of the film. At higher equivalence ratios the crosslink density is high enough to inhibit inter-polymer penetration so the acetal remains segregated on top of the ink film, and releases cleanly when pulled.

Figure 2:
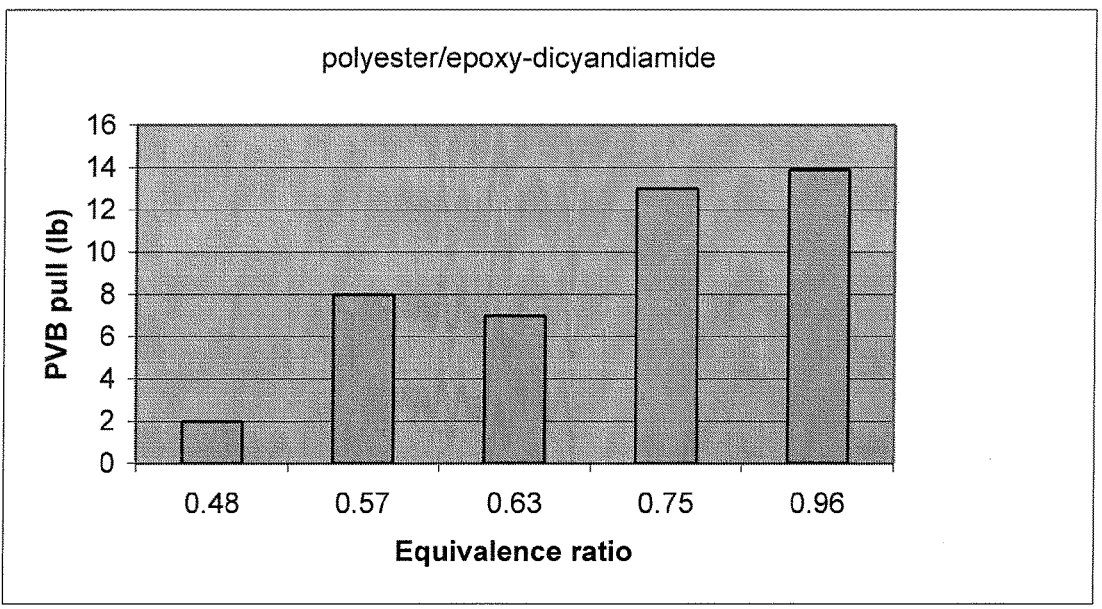
FIG. 2 is a graph showing the pull strength in pounds required to delaminate a PVB layer from a cured polyester melamine layer in relation to the equivalence ratio between epoxy-dicyandiamide crosslinker and polyester.

A second set of tests used an epoxy-dicyandiamide system, in Example 2. FIG. 2 shows much lower pull strengths from an equivalence ratio of 0.48 to 0.96. At equivalence ratios above 0.48, the acetal film released cleanly during the pull test, indicating essentially no inter-polymer penetration. At an equivalence ratio of 0.48, the ink film ripped apart, which can be interpreted as penetration by the acetal into the ink film, but poor intra-polymer integrity within the ink film. The inventors believe that the epoxy-dicyandiamide system resists inter-polymer penetration by the acetal until the crosslink density is reduced to a level where the integrity of the ink film is compromised.

Solvent resistance as measured by acetone double rubs is consistent with the above interpretations for both systems. A cotton cloth is dampened in acetone and rubbed back and forth by hand across the cured polyester melamine coating layer. One "back and forth" cycle is a "double rub." The polyester-melamine system resists over 50 double rubs at equivalence ratios of 0.875 and higher. At ratios of 0.474 and 0.685, the solvent resistance drops to 20 double rubs, while at the lower equivalence ratios the film was easily removed with a single rub. The epoxy-dicyandiamide system resists over 50 double rubs at all ratios except the lowest, where again, the resistance drops to a single rub.

Figure 3:
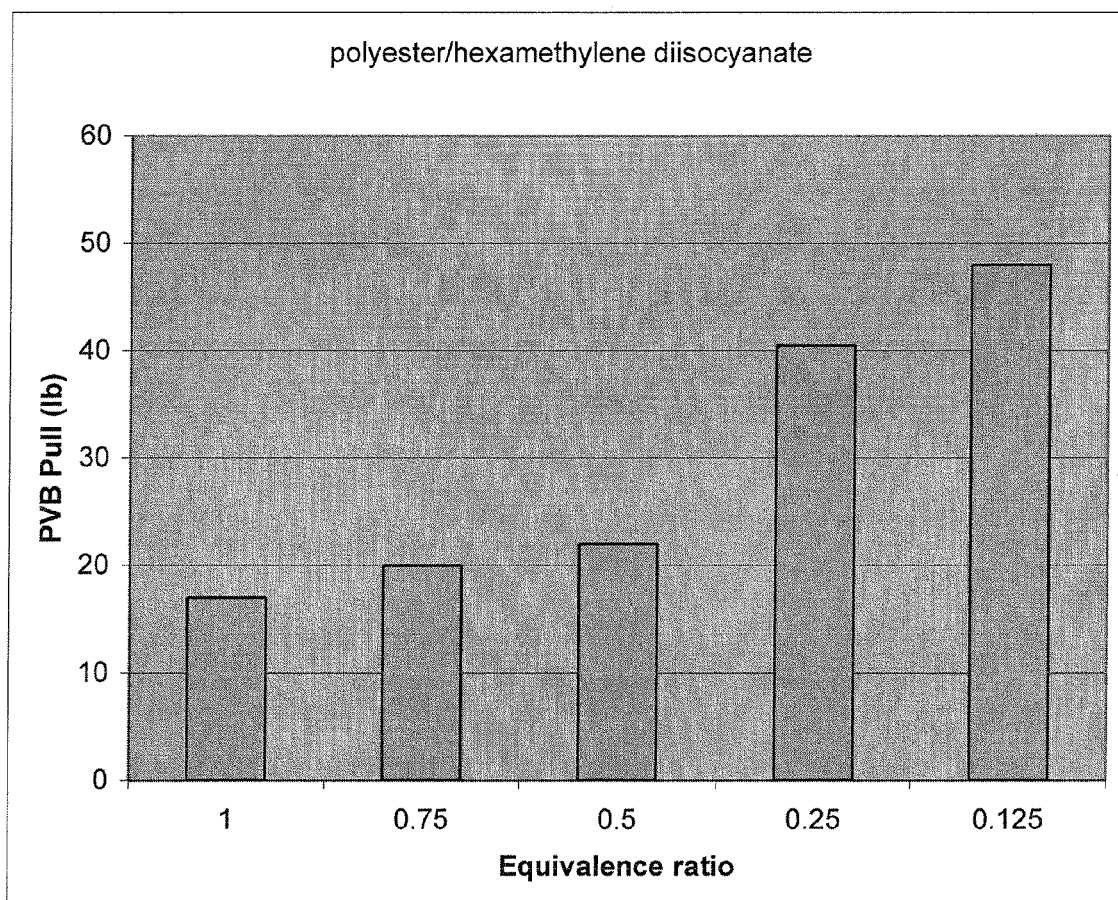
FIG. 3 is a graph showing the pull strength in pounds required to delaminate a PVB layer from a cured polyester melamine layer in relation to the equivalence ratio between hexamethylene diisocyanate crosslinker and polyester.

In Example 3, a third set of tests involved a two component system where component "A" was represented by the polyester formulation of Example 1, however in place of Cymel 303 was used Coronate HXLV, (hexamethylene 1,6-diisocyanate crosslinker). As was the case with melamine crosslinkers, the adhesion of the film to PVB increased as the ratio of NCO to OH decreased, as shown in FIG. 3.

Unlike melamine, the PVB adhesion continued to increase as crosslinker ratio decreased, with the strongest bond measured at the lowest ratio. At this level, the cured film was not of practical use, because its degree of internal cohesion was so low that the ink film formed visible gaps when the acetal film shrank in place as it was melted against the inked surface. While the overall trend is similar to that seen with melamine, overall the strength of the acetal bond is lower to the isocyanate crosslinked film.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:
1. A method of forming a laminated decorated glass structure comprising:
   a. applying to a first glass substrate an organic pigment package comprising, prior to curing,
      i. a crosslinkable thermoset resin selected from the group consisting of polyesters, urethanes, vinyl polymers, acrylics, styrenes, polyolefins, polycarbonates, copolymers thereof, and blends thereof, ii. a crosslinker capable of crosslinking the thermoset resin, selected from the group consisting of: amines, amino resins, amido resins, isocyanates, ureas, and dialdehydes, and iii. a pigment, wherein prior to curing, the crosslinker and thermoset resin are present in an equivalence ratio of about 0.2 to about 1.2;

b. curing the crosslinker and the thermoset resin to form a cured layer on the first substrate;

c. stacking an acetal layer and a second glass substrate onto the cured layer such that the acetal and the cured layer lie between the first substrate and a second glass substrate; and d. heating the first and second stacked glass substrates to flow the acetal layer and effect interpenetration of the acetal layer with the cured layer.

2. The method of claim 1, wherein, prior to curing, the crosslinker and thermoset resin are present in an equivalence ratio of about 0.4 to about 0.9.

3. The method of claim 1, wherein the crosslinker is a melamine-formaldehyde, and the thermoset resin is a polyester and wherein, prior to curing, the equivalence ratio of crosslinker to polyester is about 0.45 to about 0.7.

4. The method of claim 1, wherein the crosslinker is selected from the group consisting of melamines, acetoguanamines, benzoguanamines, ureas, and combinations thereof.

5. The method of claim 1, wherein the crosslinker is selected from the group consisting of: diphenylmethane diisocyanate, toluene diisocyanate, hexamethylene diisocyanate, naphthalene diisocyanate, methylene bis-cyclohexylisocyanate, isophorone diisocyanate, methyl isocyanate, and polymethylene polyphenyl isocyanate.

6. The method of claim 1, wherein the crosslinker is selected from the group consisting of fully alkylated melamine-formaldehyde resins, partially alkylated melamine-formaldehyde resins, and high imino melamine-formaldehyde resins.

7. The method of claim 1, wherein the pigment package further comprises at least one of
a. a surfactant,
b. an adhesion promoter,
c. an acid catalyst,
d. a light stabilizer,
e. a solvent, and
f. a rheology modifier.

8. The method of claim 1, wherein the pigment is selected from the group consisting of azo dyes, cyanine dyes, pyridine dyes, dioxane dyes, stilbene dyes, coumarin dyes, rhodamine dyes, oxazine dyes, quinone dyes, anthraquinone dyes, and naphthalimide dyes, quinacridone, phthalocyanine blue, phthalocyanine green, disazo yellow, dibromoantoanthrone, dioxane violet, 1,4-bis(2-methylstyryl)benzene, and trans-4,4'-diphenylstilbene.

9. The method of claim 1, wherein the pigment is selected from the group consisting of iron pigments, cobalt pigments, cadmium pigments, chromium pigments, copper mercury pigments, titanium pigments, zinc pigments, lead pigments, magnesium pigments, manganese pigments, and vanadium pigments.

10. The method of claim 1, wherein the pigment is selected from the group consisting of: carbon black, titanium dioxide, $Fe_2O_3$, $Fe_3O_4$, $V_2O_5$, $CoO-Al_2O_3-TiO_2-Cr_2O_3$, $CoO-Al_2O_3$, $CeO_2$, $ZrO_2$, zinc oxide, magnesium ferrite, mercuric sulfide, cadmium sulfoselenide, molybdenum chromate, zircon, copper chrome black, iron nickel manganese chrome black, cobalt aluminate blue, zinc iron chrome brown, and iron cobalt chrome.

11. The method of claim 1, wherein the pigment package comprises:
a. about 60 to about 85 wt % of thermoset resin+crosslinker,
b. about 5 to about 15 wt % of pigment, and
c. further comprises a solvent, wherein said solvent is present in the pigment package to the extent of about 3 to about 15 wt % of a solvent.

12. The method of claim 1, wherein the pigment package composition comprises:
a. about 60 to about 65 wt % thermoset resin,
b. about 7 to about 13 wt % crosslinker,
c. about 5 to about 10 wt % pigment,
d. about 0.1 to about 1 wt % surfactant,
e. about 0.1 to about 3 wt % rheological modifier,
f. about 0.1 to about 1 wt % adhesion promoter,
g. about 0.1 to about 4 wt % light stabilizers/blockers,
h. about 5 to about 15 wt % solvent, and
i. about 0.1 to about 2 wt % catalyst.

13. The method of claim 1, wherein the thermoset resin is a polyester resin having a hydroxyl equivalent weight of about 200 to about 1500.

14. The method of claim 1, wherein the decorated glass structure is a flat piece of automotive glass.

15. The method of claim 1, wherein, prior to applying the organic pigment package to the first glass substrate, the first and second glass substrates are bent.

16. The method of claim 1, wherein during the step (a) of applying to the first glass substrate an organic pigment package, a technique selected from the group consisting of screen printing, roll coating, air-assisted spray, airless spray, inkjet, rotary screen print, thermal transfer ribbon, electrostatic disk, and electrostatic bell is utilized.

17. The method of claim 1, wherein the first and second glass substrates are bent prior to applying the pigment composition and wherein the pigment composition is applied to the first glass substrate by ink jet printing.

* * * * *